United States Patent
Wang et al.

(10) Patent No.: US 8,416,855 B2
(45) Date of Patent: Apr. 9, 2013

(54) MOTION VECTOR CODING MODE SELECTION METHOD AND CODING MODE SELECTION APPARATUS AND MACHINE READABLE MEDIUM USING THE SAME

(75) Inventors: Yi-Jung Wang, Hsinchu (TW); Guo-Zua Wu, Taichung (TW); Oscal Tzyh-Chiang Chen, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 493 days.

(21) Appl. No.: 12/473,234

(22) Filed: May 27, 2009

(65) Prior Publication Data

US 2010/0158121 A1 Jun. 24, 2010

(30) Foreign Application Priority Data

Dec. 23, 2008 (TW) ................................ 97150204 A (51) Int. Cl.
*H04N 7/28* (2006.01)
(52) U.S. Cl. .............................. 375/240.16; 375/240.24
(58) Field of Classification Search ............. 375/240.16, 375/240.24
See application file for complete search history.

(56) References Cited

U.S. PATENT DOCUMENTS

| | | | |
|---|---|---|---|
| 6,141,381 A | 10/2000 | Sugiyama | |
| 6,175,593 B1 | 1/2001 | Kim et al. | |
| 7,133,447 B2 | 11/2006 | Byun et al. | |
| 7,206,346 B2 | 4/2007 | Shimizu et al. | |
| 7,272,182 B1 | 9/2007 | Nakagawa et al. | |
| 2004/0057521 A1* | 3/2004 | Brown et al. | 375/240.25 |
| 2004/0233989 A1* | 11/2004 | Kobayashi et al. | 375/240.16 |
| 2005/0053298 A1* | 3/2005 | Mukerjee et al. | 382/236 |
| 2008/0063290 A1* | 3/2008 | Lin et al. | 382/236 |
| 2009/0016443 A1* | 1/2009 | Kim et al. | 375/240.24 |

OTHER PUBLICATIONS

Taiwan Patent Office, Office Action, Application Serial No. 97150204, May 25, 2012, Taiwan.

* cited by examiner

*Primary Examiner* — Sath V Perungavoor
*Assistant Examiner* — Jeffery Williams (57) ABSTRACT

A coding mode selection method for selecting a coding mode for motion vector estimation is disclosed. The method includes the following steps. First, a first coding mode is selected to perform motion vector estimation for a macroblock having M sub-blocks. M motion vectors corresponding to the M sub-blocks are separately calculated. It is determined whether correlations for the M motion vectors match to a predetermined condition. If not, the first coding mode is selected and the M motion vectors are utilized to perform a motion vector estimation; and if so, a second coding mode is selected and the N motion vectors corresponding to the second coding mode are utilized to perform the motion vector estimation, wherein the N motion vectors are generated by using the M motion vectors and $1 \leq N < M$.

18 Claims, 4 Drawing Sheets

MOTION VECTOR CODING MODE SELECTION METHOD AND CODING MODE SELECTION APPARATUS AND MACHINE READABLE MEDIUM USING THE SAME

CROSS-REFERENCE STATEMENT

This Application claims priority of Taiwan Patent Application No. 097150204, filed on Dec. 23, 2008, the entirety of which is incorporated by reference herein.

BACKGROUND

1. Technical Field

The disclosure relates generally to coding mode selection methods and apparatuses using the same, and, more particularly to coding mode selection methods and apparatuses using the same for selecting a suitable coding mode for motion vector estimation from multiple selectable coding modes.

2. Background

Motion vector estimation is an important technique for motion image compression, which is used to estimate correlation between two pictures. Generally, when performing motion vector estimation to a system that is capable of supporting two or more motion vector modes, such as a one motion vector mode (hereinafter referred to as 1MV mode) and a four motion vectors mode (hereinafter referred to as 4MV mode), in order to select a best coding mode for motion vector estimation, respective motion vector information for each motion vector coding mode is calculated at the same time. Next, a determination is made, based on methodology, as to which coding mode to use for motion vector estimation. For example, one conventional coding mode selection method calculates summation of absolute differential (SADs) of blocks in a current image and a corresponding reference image in each coding mode in advance and then selects a coding mode with the smallest difference value from the calculated SADs and selects motion vector information corresponding thereto as a coding mode for use in a subsequent coding process.

The coding mode selection method, however, requires calculating related information for two or more motion vector modes simultaneously, thus additional time for the coding process is required and computational complexity is increased, increasing costs. Furthermore, additional hardware components are required, also increasing costs.

SUMMARY

Coding mode selection apparatuses and a selection method for selecting a coding mode for motion vector estimation are provided to reduce computational complexity.

In an embodiment of a selection method for selecting a coding mode for motion vector estimation, a first coding mode is first selected, wherein M sub-blocks of a macroblock are calculated as a calculation unit in the first coding mode. M motion vectors, each corresponding to one of the M sub-blocks, are then separately calculated. It is determined whether correlations for the M motion vectors match to a predetermined condition. When correlations for the M motion vectors do not match to the predetermined condition, the first coding mode is selected and the M motion vectors are utilized to perform motion vector estimation. When correlations for the M motion vectors match to the predetermined condition, a second coding mode is selected and N motion vectors corresponding to the second coding mode are utilized to perform the motion vector estimation, wherein the N motion vectors are generated by using the M motion vectors and $1 \leq N < M$.

An embodiment of a coding mode selection apparatus for selecting a coding mode for motion vector estimation comprises a motion vector calculator and a coding mode switching unit. The motion vector calculator separately calculates M motion vectors, wherein each of the M motion vectors corresponds to one of M sub-blocks in a macroblock. The coding mode switching unit is coupled to the motion vector calculator for switching between first and second coding modes, wherein the M sub-blocks of the macroblock are calculated as a calculation unit in the first coding mode. The coding mode switching unit receives the M motion vectors, selects the first coding mode and determines whether correlations for the M motion vectors match to a predetermined condition. The coding mode switching unit selects the first coding mode and utilizes the M motion vectors to perform a motion vector estimation when correlations for the M motion vectors do not match to the predetermined condition and selects a second coding mode and utilizes N motion vectors corresponding to the second coding mode to perform the motion vector estimation when correlations for the M motion vectors match to the predetermined condition, wherein the N motion vectors are generated by using the M motion vectors and $1 \leq N < M$.

In another embodiment of a selection method for selecting a coding mode for motion vector estimation comprises selecting a first coding mode, wherein M sub-blocks of a macroblock are calculated as a calculation unit in the first coding mode. Thereafter, M motion vectors are calculated, wherein each correspond to one of the M sub-blocks. Next, correlations for the M motion vectors are determined and it is determined whether to switch to a second coding mode according to a correlation determination result for the M motion vectors. When it is determined to switch to the second coding mode, the M motion vectors are utilized to generate the N motion vectors and the second coding mode is switched to utilize the N motion vectors to perform motion vector estimation, where $1 \leq N < M$.

Coding mode selection methods for selecting a coding mode for motion vector estimation and coding mode selection apparatuses may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF DISCLOSED EMBODIMENT

In an embodiment is described with reference to FIGS. 1 through 4, which generally relate to coding mode selection methods and apparatuses for selecting a coding mode for motion vector estimation. In the following detailed description, reference is made to the accompanying drawings which from a part hereof, shown by way of illustration of the disclosed embodiments. The embodiments are described in sufficient detail to enable those skilled in the art to practice the invention, and it is to be understood that other embodiments may be utilized and that structural, logical and electrical changes may be made, without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

Figure 1:
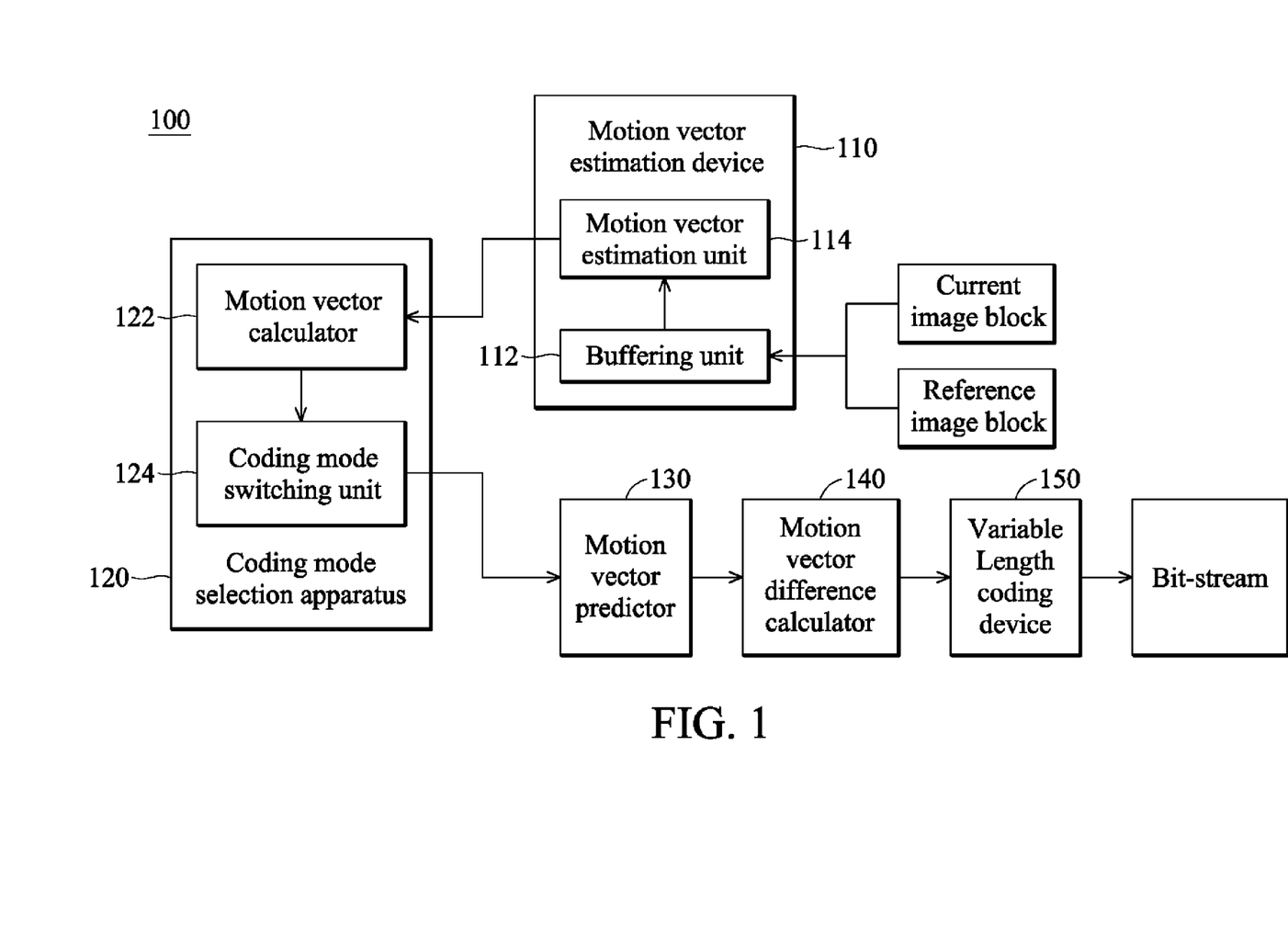
FIG. 1 is a schematic diagram illustrating an embodiment of a motion image processing system of the invention.

FIG. 1 is a schematic diagram illustrating an embodiment of a motion picture processing system 100 of the invention. As shown in FIG. 1, the motion picture processing system 100 at least comprises a motion vector (MV) estimation device 110, a coding mode selection apparatus 120, an MV predictor 130, an MV difference calculator 140 and variable length coding (VLC) device 150. The MV estimation device 110 stores received current image blocks in a current image and respectively reference image blocks in a corresponding reference image into a buffering unit 112 and then utilizes an MV estimation unit 114 to perform an MV estimation so as to generate required motion vectors. Typically, the reference image blocks in the reference image are defined as adjacency blocks around the current image block in a current image. Description regarding how to choose the reference image blocks and how to utilize the current image block and the respective reference image block(s) to perform the MV estimation are well-known and thus detailed description is omitted here.

The coding mode selection apparatus 120 is coupled to the MV estimation device 110 and receives motion vectors generated by the MV estimation device 110 and further performs an MV coding mode selection method of the invention to select a suitable MV coding mode for further coding. The coding mode selection apparatus 120 may further comprise an MV calculator 122 and a coding mode switching unit 124. The MV calculator 122 separately calculates M motion vectors information corresponding to M sub-blocks of a macroblock in which M is an integer larger than zero and sizes of the M sub-blocks are equal to that of one macroblock. The coding mode switching unit 124 is coupled to the MV calculator 122 for switching between at least first and second coding modes. During operation, the coding mode switching unit 124 receives the M motion vectors calculated by the MV calculator 122, selects the first coding mode and determines whether correlations for the M motion vectors match to a predetermined condition. When the correlations for the M motion vectors do not match to the predetermined condition, the coding mode switching unit 124 selects the first coding mode and utilizes the M motion vectors to perform a motion vector estimation. When the correlations for the M motion vectors match to the predetermined condition, the coding mode switching unit 124 switches to the second coding mode and utilizes N motion vectors corresponding to the second coding mode to perform the motion vector estimation, wherein the N motion vectors are generated by using the M motion vectors and 1 N M. Description regarding steps of an MV coding mode selection method according to the invention is detailed as follows.

When an MV coding mode has been selected by the coding mode selection apparatus 120, the MV predictor 130 performs an MV prediction operation based on the selected MV coding mode and passes the predicted results to the MV difference calculator 140. The MV difference calculator 140 performs an MV difference calculation to the predicted results and then the VLC device 150 performs variable length coding to the calculated result to generate a final integrated bit stream.

For example, in the VC-1 video compression coding standard, two coding modes, such as an All-1MV mode and a mixed-MV mode, may be supported while performing motion vector estimation in the P frames. The mixed-MV mode may comprise two MV coding modes, such as a 1MV mode and a 4MV mode. Therefore, when the mixed-MV mode has been applied, a suitable coding mode has to be determined in advance for further coding.

Note that the 1MV mode is in a one macroblock unit (e.g. a block with a block size 16*16) and is capable of generating one MV for representing motion information between a current image block in a current image and the respective reference image block in the reference image of the one macroblock while the 4MV mode is in four sub-block s (e.g. a sub-block may represent a luminance block with a block size 8*8) of one macroblock unit (e.g. a block with a block size 16*16) and is capable of generating four MVs for representing motion vector information between a current image block in a current image and the respective reference image block in the reference image of one of the four sub-blocks.

Figure 2:
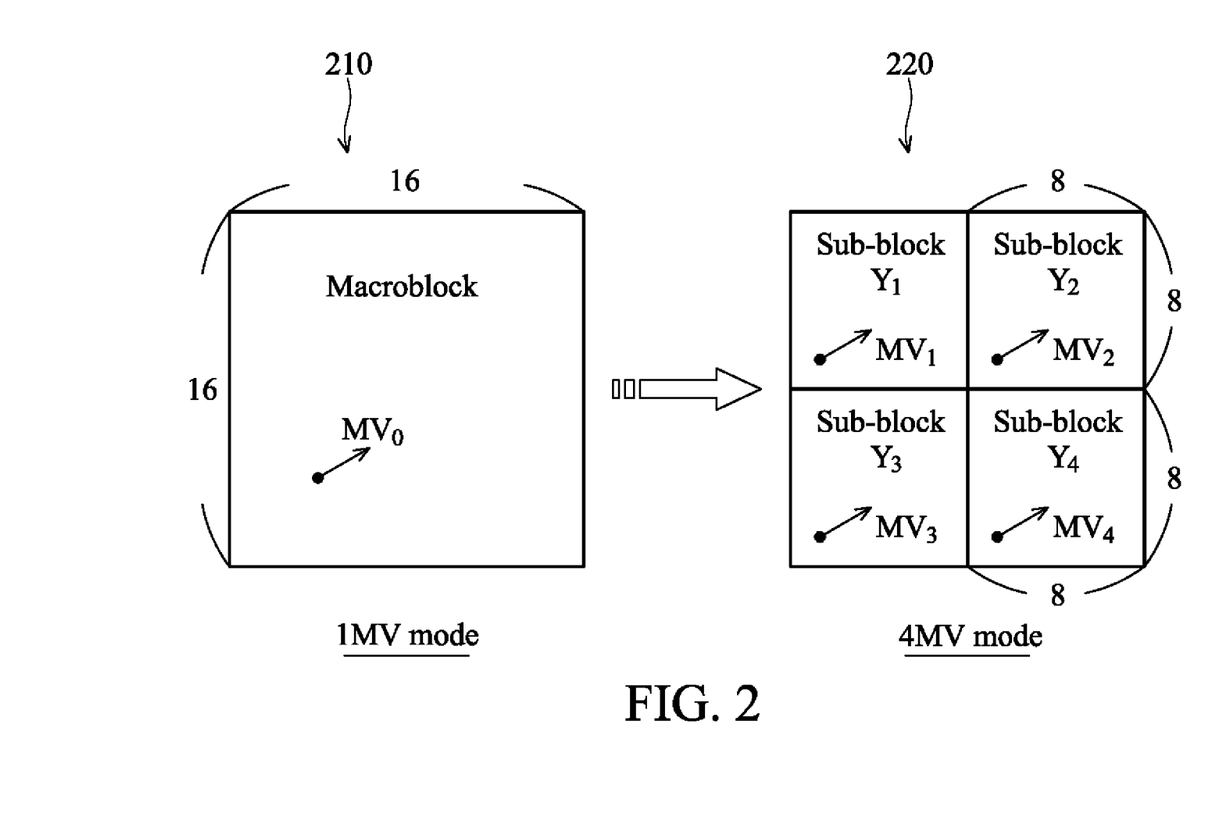
FIG. 2 is a schematic diagram illustrating an embodiment of two motion vector modes of the invention.

Referring to FIG. 2, FIG. 2 is a schematic diagram illustrating an embodiment of two MV modes of the invention. In FIG. 2, a 1MV mode 210 and a 4MV mode 220 are illustrated. In the 1MV mode 210, motion vector estimation is performed in a unit of one macroblock with a block size 16*16 to generate one MV $MV_0$ while, in the 4MV mode 220, motion vector estimation is performed in a unit of four sub-blocks $Y_1$-$Y_4$, each with a block size 8*8, to generate four MVs $MV_1$-$MV_4$.

Therefore, with the coding mode switching apparatus 120, motion vector information for blocks with smaller block sizes may be simply calculated and motion vector information for a macroblock with larger block sizes may then be derived from correlations between motion vector information for the blocks with smaller block sizes, thereby saving additional calculating units needed for simultaneously calculating motion vector information in every MV mode and providing a simple determination mechanism to easily switch between each MV modes.

Figure 3:
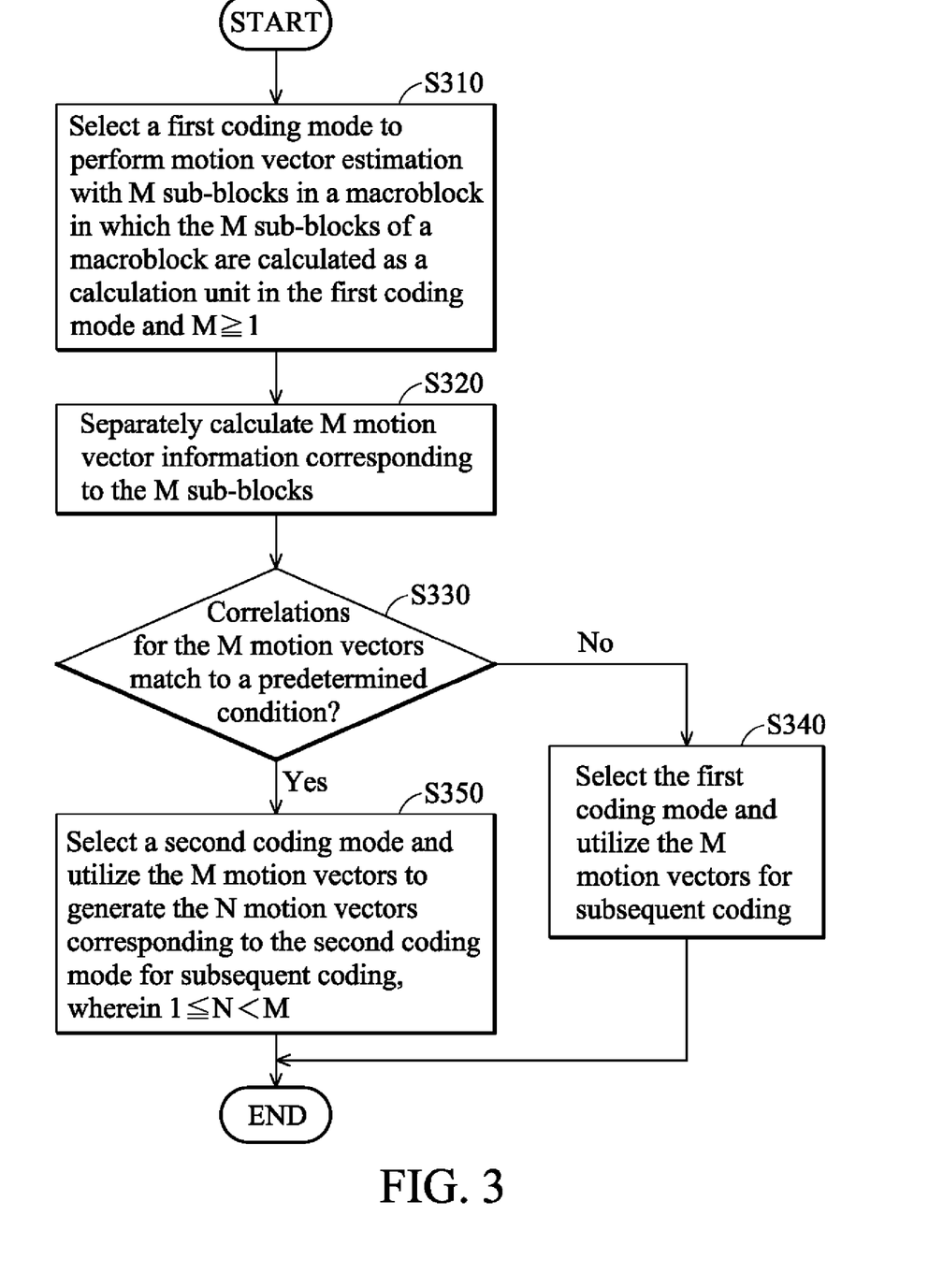
FIG. 3 is a flowchart of an embodiment of a coding mode selection method for selecting a motion vector coding mode of the invention.

FIG. 3 is a flowchart of an embodiment of a coding mode selection method for selecting an MV coding mode of the invention. The coding mode selection method of the invention may be performed by the coding mode selection apparatus 120 shown in FIG. 1.

First, in step S310, the coding mode selection apparatus 120 selects a first coding mode to perform motion vector estimation with M sub-blocks in a macroblock in which the M sub-blocks of a macroblock are calculated as a calculation unit in the first coding mode and M≧1. Thereafter, in step S320, M motion vector information corresponding to the M sub-blocks are separately calculated, wherein each of the M motion vector information corresponds to one of the M sub-blocks. For example, the MV calculator 122 may calculate a motion vector information between a current image block in a current image and corresponding reference image block in the reference image for each of the M sub-blocks to obtain M corresponding motion vectors, wherein each of the M motion vectors has a vector value in an X direction (motion vector value in horizontal direction) and a vector value in a Y direction (motion vector value in vertical direction). When the M motion vectors have been calculated, in step S330, the coding mode switching unit 124 receives the M motion vectors calculated by the MV calculator 122 and determines whether correlations for the M motion vectors match to a predetermined condition and determines whether to select or switch to a second coding mode according to a correlation determination result for the M motion vectors. For example, the coding mode switching unit 124 may determine whether the correlations for the M motion vectors match to the predetermined condition by determining whether the M motion vectors are similar or equal to each other. In one embodiment, determining whether the M motion vectors are similar or equal to each other may be performed by determining whether each SAD value, that is obtained by computing the SAD between each of the M motion vectors and an average value of the M motion vectors, is less than or equal to a threshold value, where the threshold value is an integer larger than or equal to 0.

The M motion vectors are determined as similar or equal to each other when all of the SAD values are less than or equal to the threshold value. On the contrary, when all of the SAD values exceed the threshold value, the M motion vectors are determined as being dissimilar or unequal to each other. For example, if $MV_x$ represents the $X^{th}$ motion vector and $0 \leq X < M$, the determination result in step S330 may be obtained by determining whether the following equations have been satisfied:

$$|MV_0 - MV_{mean}| \leq THR$$
$$|MV_1 - MV_{mean}| \leq THR$$
$$|MV_2 - MV_{mean}| \leq THR$$
$$\vdots$$
$$|MV_{M-1} - MV_{mean}| \leq THR,$$

where $MV_{mean} = (MV_0 + MV_1 + \ldots + MV_{M-1})/M$ which represents an average value of the M motion vectors, and THR represents a predetermined threshold value that exceeds or equals to 0. In other words, the M motion vectors may be determined as being similar or equal to each other only when all of the SAD values between each of the M motion vectors and the average value of the M motion vectors are less than or equal to the threshold value THR.

In step S330, determining that the correlations for the M motion vectors does not match the predetermined condition (e.g. each SAD value, that is obtained by computing the SAD between each of the M motion vectors and the average value of the M motion vectors, exceeds the threshold value) (No in step S330), represents that the difference between the M motion vectors are larger and thus, in step S340, the coding mode switching unit 124 selects the first coding mode and utilizes the M motion vectors for subsequent coding.

On the contrary, determining that the correlations for the M motion vectors match the predetermined condition (e.g. each SAD value, that is obtained by computing the SAD between each of the M motion vectors and the average value of the M motion vectors, is less than or equal to the threshold value) (Yes in step S330), represents that the difference between the M motion vectors are smaller than the threshold value or no difference is determined therebetween, and thus, in step S350, the coding mode switching unit 124 selects or switches to a second coding mode and utilizes the M motion vectors to generate the N motion vectors corresponding to the second coding mode for subsequent coding, wherein 1 N M. For example, in one embodiment, operation for utilizing the M motion vectors to generate the N motion vectors corresponding to the second coding mode may be achieved by performing a specific simplification operation, such as an averaging operation, to a portion or all of the M motion vectors and then utilizing the operation result (e.g. averaged vector values in an X and Y directions) to obtain the N motion vectors. For example, in this embodiment, if four motion vectors are used to derive one motion vector (i.e. M=4 and N=1), an averaging operation may be performed to average vector values in X and Y directions for all of the four motion vectors respectively to obtain first and second average values which serve as the averaged vector values in the X and Y directions and configure the first and second average values to be the one motion vector.

Thereafter, the selected coding mode may further be applied to the subsequent MV prediction operation, MV difference calculation and variable length coding so as to generate an integrated bit stream.

Therefore, with the MV coding mode selection method of the invention, computation for selecting among multiple coding modes is simplified and overall coding efficiency is improved.

Following illustrates an embodiment of the MV coding mode selection method according to the invention, but the invention is not limited thereto.

Figure 4:
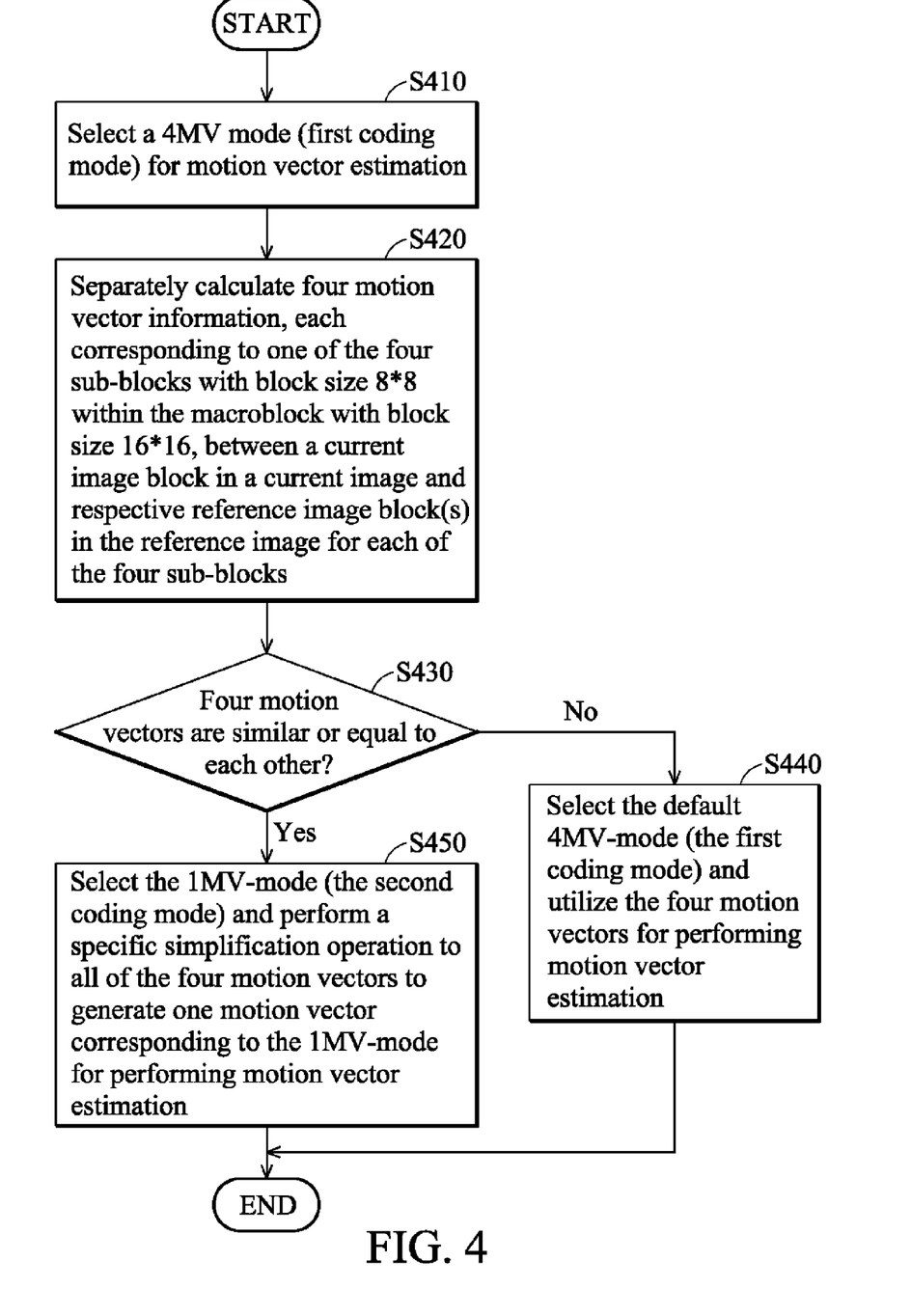
FIG. 4 is a flowchart of another embodiment of a coding mode selection method for selecting a motion vector coding mode of the invention.

FIG. 4 is a flowchart of another embodiment of a coding mode selection method for selecting an MV coding mode of the invention. It is assumed that a mixed-MV mode compatible with the VC-1 video compression standard is applied in the motion vector estimation, wherein the mix-MV mode comprises two MV coding modes, such as 1MV mode and a 4MV mode. As aforementioned, the 1MV mode is in a one macroblock unit (e.g. a block with a block size 16*16) and is capable of generating one MV for representing motion information between a current image block in a current image and the respective reference image block in the reference image of the one macroblock while the 4MV mode is in four sub-blocks (e.g. a sub-block may represent a luminance block with a block size 8*8) of one macroblock unit (e.g. a block with a block size 16*16) and is capable of generating four MVs for representing a motion vector information between a current image block in a current image and the respective reference image block in the reference image of one of the four sub-blocks (as shown in FIG. 2). Similarly, the coding mode selection method of the invention may be performed by the coding mode selection apparatus 120 shown in FIG. 1.

First, in step S410, the 4MV mode (the first coding mode) is first selected, and in step S420, four motion vector information, each corresponding to one of the four sub-blocks with block size 8*8 within the macroblock with block size 16*16, between a current image block in a current image and respective reference image block(s) in the reference image for each of the four sub-blocks are separately calculated. Thus, four motion vector information $MV_0$-$MV_3$ corresponding to the four sub-blocks will be generated.

When the four motion vectors have been calculated, in step S430, it is determined whether correlations for the M motion vectors match a predetermined condition. For example, whether the correlations for the four motion vectors match the predetermined condition may be determined by determining whether the M motion vectors are similar or equal to each other. As described previously, determining whether the M motion vectors are similar or equal to each other may be performed by determining whether each SAD value, that is obtained by computing the SAD between each of the M motion vectors and an average value of the M motion vectors, is less than or equal to a threshold value, where the threshold value is an integer larger than or equal to 0.

The four motion vectors may be determined as being similar or equal to each other when all of the SAD values are less than or equal to the threshold value. On the contrary, the four motion vectors may be determined as being dissimilar or unequal to each other when all of the SAD values exceed the threshold value. For example, if $MV_x$ represents the $X^{th}$ motion vector and 0 X<4, the determination result in step S430 may be obtained by determining whether the following equations have been satisfied:

$$|MV_0-MV_{mean}|\leq THR$$

$$|MV_1-MV_{mean}|\leq THR$$

$$|MV_2-MV_{mean}|\leq THR$$

$$|MV_3-MV_{mean}|\leq THR,$$

where $MV_{mean}=(MV_0+MV_1+MV_2+MV_3)/4$ which represents an average value of the four motion vectors, and THR represents a predetermined threshold value that exceeds or equals to 0. In other words, the four motion vectors may be determined as being similar or equal to each other only when all of the SAD values between each of the four motion vectors and the average value of the four motion vectors are less than or equal to the threshold value THR.

Thereafter, in step S430, determining that the four motion vectors are dissimilar and unequal to each other (e.g. each SAD value, that is obtained by computing the SAD between each of the four motion vectors and the average value of the four motion vectors, exceeds the threshold value) (No in step S430), represents that the difference between the four motion vectors are larger and thus, in step S440, the default 4MV-mode is selected (the first coding mode) and the four motion vectors are utilized for performing motion vector estimation.

On the contrary, determining that the four motion vectors are similar or equal to each other (e.g. each SAD value, that is obtained by computing the SAD between each of the four motion vectors and the average value of four motion vectors, is less than or equal to the threshold value) (Yes in step S430), represents that the difference between the four motion vectors are smaller than the threshold value or no difference is determined therebetween, and thus, in step S450, the 1MV-mode (the second coding mode) is selected and a specific simplification operation, such as an averaging operation, may be performed to all of the four motion vectors to generate one motion vector corresponding to the 1MV-mode for performing motion vector estimation.

Thereafter, the selected coding mode may further be applied to the subsequent MV prediction operation, MV difference calculation and variable length coding operation so as to generate an integrated bit stream.

In addition to the VC-1 standard, the invention may also be applied in other video compression standards, such as the H. 264 standard. By first calculating motion vector information for blocks with smaller block sizes (e.g. 4*4 or 8*8) within the same macroblock and then utilizing the correlations between motion vector information for blocks with smaller block sizes to derive motion vector information for blocks with larger sizes as aforementioned, support for multiple MV modes can be achieved and the coding efficiency can also be increased.

In summary, according to the MV coding mode selection method and apparatus using the same of the invention, when multiple motion vectors are similar or equal, the motion vectors may be simplified to fewer motion vectors, thereby not only maintaining original image quality but also saving bit stream size due to the reduction in motion vector information. Furthermore, with a simple determination mechanism, the invention can also achieve easy switching between multiple MV modes.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Certain terms are used throughout the descriptions and claims to refer to particular system components. As one skilled in the art will appreciate, consumer electronic equipment manufacturers may refer to a component by different names. This document does not intend to distinguish between components that differ in name but not function.

While the invention has been described by way of example and in terms of embodiment, it is to be understood that the invention is not limited thereto. Those who are skilled in this technology can still make various alterations and modifications without departing from the scope and spirit of this invention. Therefore, the scope of the disclosure embodiment shall be defined and protected by the following claims and their equivalents.

What is claimed is:

1. A coding mode selection method for selecting a coding mode for motion vector estimation, wherein the coding mode includes first and second coding modes, comprising:

selecting the first coding mode, wherein M sub-blocks of a macroblock are calculated as a calculation unit in the first coding mode;

separately calculating M motion vectors for the first coding mode, wherein each of the M motion vectors correspond to one of the M sub-blocks; and determining whether to select the second coding mode to perform a motion vector estimation by determining whether correlations for the M motion vectors of the first coding mode match to a predetermined condition;

wherein when correlations for the M motion vectors of the first coding mode do not match to the predetermined condition, selecting the first coding mode and utilizing the M motion vectors to perform the motion vector estimation without further calculating N motion vectors corresponding to the second coding mode, and when correlations for the M motion vectors of the first coding mode match to the predetermined condition, selecting the second coding mode and utilizing the N motion vectors corresponding to the second coding mode to perform the motion vector estimation, wherein the N motion vectors are generated by using the M motion vectors and 1≦N<M and the determination of whether the correlations for the M motion vectors match to the predetermined condition is performed by determining whether the M motion vectors are similar or equal to each other and if so, the correlations for the M motion vectors are determined to be matched to the predetermined condition.

2. The coding mode selection method of claim 1, wherein the determination of whether the M motion vectors are similar or equal to each other is performed by determining whether each SAD (Summation of Absolute Difference) value, that is obtained by computing the SAD between each of the M motion vectors and an average value of the M motion vectors, is less than or equal to a threshold value, where the threshold value is larger than or equal to 0, and if so, the M motion vectors are determined as similar or equal to each other.

3. The coding mode selection method of claim 2, wherein the M motion vectors are determined as dissimilar or unequal to each other when all of the SAD values exceed the threshold value.

4. The coding mode selection method of claim 1, further comprising:
performing a specific simplification operation to a portion or all of the M motion vectors to obtain the N motion vectors.

5. The coding mode selection method of claim 4, wherein the specific simplification operation comprises an averaging operation for calculating an average value of the portion or all of the M motion vectors and the N motion vectors are obtained based on the calculated average value.

6. The coding mode selection method of claim 1, wherein the first coding mode is defined as a four motion vectors (4MV) mode and the second coding mode is defined as a one motion vector (1MV) mode.

7. The coding mode selection method of claim 6, further comprising:
performing an averaging operation to average vector values in an X and Y directions for all of the four motion vectors respectively to obtain first and second average values of the vector values in the X and Y directions; and
configuring the first and second average values of the vector values in the X and Y directions to be the one motion vector.

8. The coding mode selection method of claim 6, wherein the step of separately calculating M motion vectors further comprises:
calculating motion vector information between a current image block and a reference image block for each sub-block in the M sub-blocks to obtain the M motion vectors.

9. A coding mode selection apparatus for selecting a coding mode for motion vector estimation, wherein the coding mode includes first and second coding modes, comprising:
a motion vector calculator, separately calculating M motion vectors for the first coding mode, wherein each of the M motion vectors corresponding to one of M sub-blocks in a macroblock; and
a coding mode switching unit coupled to the motion vector calculator for switching between the first and second coding modes, wherein the M sub-blocks of the macroblock are calculated as a calculation unit in the first coding mode,
wherein the coding mode switching unit receives the M motion vectors, selects the first coding mode and determining whether to select the second coding mode to perform a motion vector estimation by determining whether correlations for the M motion vectors of the first coding mode match to a predetermined condition and the coding mode switching unit selects the first coding mode and utilizes the M motion vectors to perform the motion vector estimation without further calculating N motion vectors corresponding to the second coding mode when correlations for the M motion vectors of the first coding mode do not match to the predetermined condition; and selects the second coding mode and utilizes the N motion vectors corresponding to the second coding mode to perform the motion vector estimation when correlations for the M motion vectors match to the predetermined condition, wherein the N motion vectors are generated by using the M motion vectors and 1≦N<M and the coding mode switching unit further determines whether the correlations for the M motion vectors match to the predetermined condition by determining whether the M motion vectors are similar or equal to each other and if so, the correlations for the M motion vectors are to be matched to the predetermined condition.

10. The coding mode selection apparatus of claim 9, wherein the coding mode switching unit further determines whether the M motion vectors are similar or equal to each other by determining whether each SAD (Sum Absolute Difference) value, that is obtained by computing the SAD between each of the M motion vectors and an average value of the M motion vectors, is less than or equal to a threshold value, where the threshold value is larger than or equal to 0, and if so, determines the M motion vectors as similar or equal to each other.

11. The coding mode selection apparatus of claim 10, wherein the coding mode switching unit further determines the M motion vectors as dissimilar or unequal to each other when all of the SAD values exceed the threshold value.

12. The coding mode selection apparatus of claim 9, wherein the coding mode switching unit further performs a specific simplification operation to a portion or all of the M motion vectors to obtain the N motion vectors.

13. The coding mode selection apparatus of claim 12, wherein the specific simplification operation comprises an averaging operation for calculating an average value of the portion or all of the M motion vectors and the N motion vectors are obtained based on the calculated average value.

14. The coding mode selection apparatus of claim 9, wherein the first coding mode is defined as a four motion vectors (4MV) mode and the second coding mode is defined as a one motion vector (1MV) mode.

15. The coding mode selection apparatus of claim 14, wherein the coding mode switching unit further performs an averaging operation to average vector values in an X and Y directions for all of the four motion vectors respectively to obtain first and second average values of the vector values in the X and Y directions and configures the first and second average values of the vector values in the X and Y directions to be the one motion vector.

16. The coding mode selection apparatus of claim 9, wherein the coding mode switching unit further calculates motion vector information between a current image block and a reference image block for each sub-block in the M sub-blocks to obtain the M motion vectors.

17. A selection method for selecting a coding mode for motion vector estimation, wherein the coding mode includes first and second coding modes, comprising:
selecting the first coding mode, wherein M sub-blocks of a macroblock are calculated as a calculation unit in the first coding mode;
calculating M motion vectors for the first coding mode, wherein each correspond to one of the M sub-blocks;
determining correlations for the M motion vectors;
determining whether to switch to the second coding mode according to a correlation determination result for the M motion vectors;

when determining to switch to the second coding mode, utilizing the M motion vectors to generate the N motion vectors; and switching to the second coding mode and utilizing the N motion vectors to perform motion vector estimation, where $1 \leq N < M$ and the determination of whether to switch to the second coding mode according to the correlation determination result for the M motion vectors is performed by determining whether the M motion vectors are similar or equal to each other and if so, determining to switch to the second coding mode.

18. A non-transitory machine-readable storage medium comprising a computer program, which, when executed, causes a device to perform a selection method for selecting a coding mode for motion vector estimation, wherein the coding mode includes first and second coding modes, and the method comprising:

selecting the first coding mode, wherein M sub-blocks of a macroblock are calculated as a calculation unit in the first coding mode;

separately calculating M motion vectors for the first coding mode, wherein each of the M motion vectors correspond to one of the M sub-blocks; and determining whether to select the second coding mode to perform a motion vector estimation by determining whether correlations for the M motion vectors of the first coding mode match to a predetermined condition;

wherein when correlations for the M motion vectors of the first coding mode do not match to the predetermined condition, selecting the first coding mode and utilizing the M motion vectors to perform the motion vector estimation without further calculating N motion vectors corresponding to the second coding mode, and when correlations for the M motion vectors of the first coding mode match to the predetermined condition, selecting the second coding mode and utilizing the N motion vectors corresponding to the second coding mode to perform the motion vector estimation, wherein the N motion vectors are generated by using the M motion vectors and $1 \leq N < M$ and the determination of whether the correlations for the M motion vectors of the first coding mode match to the predetermined condition is performed by determining whether the M motion vectors are similar or equal to each other and if so, the correlations for the M motion vectors of the first coding mode are determined to be matched to the predetermined condition.

* * * * *